United States Patent [19]

O'Connor

[11] 4,083,524
[45] Apr. 11, 1978

[54] PANHEAD DRAG MECHANISM

[76] Inventor: Chadwell O'Connor, 2024 Galaxy Dr., Newport Beach, Calif. 92660

[21] Appl. No.: 722,216

[22] Filed: Sep. 10, 1976

[51] Int. Cl.² ............................................ F16M 11/12
[52] U.S. Cl. .................................... 248/183; 188/271; 188/290; 308/187
[58] Field of Search ........................ 188/268, 290, 271; 308/187; 89/37 H; 248/183, 185, 186; 92/58 R, 58 B

[56] References Cited

U.S. PATENT DOCUMENTS

| | | | |
|---|---|---|---|
| 1,266,310 | 5/1918 | Pfanstiehl | 308/187 X |
| 2,111,012 | 3/1938 | Tondreau | 248/183 |
| 2,125,617 | 8/1938 | Niemann | 188/268 X |
| 2,403,397 | 7/1946 | Rankin | 308/187 X |
| 2,775,317 | 12/1956 | Sinisterra | 188/290 X |
| 3,123,330 | 3/1964 | Robinson | 248/183 |
| 3,180,603 | 4/1965 | O'Connor | 188/266 X |
| 3,303,898 | 2/1967 | Bercaru | 308/187 X |
| 3,877,552 | 4/1975 | Higginson et al. | 188/290 X |

FOREIGN PATENT DOCUMENTS 379,496  9/1932  United Kingdom .............. 192/58 R Primary Examiner—George E. A. Halvosa
Attorney, Agent, or Firm—John G. Mesaros

[57] ABSTRACT

A panhead for mounting, panning and tilting instruments such as cameras, the panhead having an adjustable drag system accomplished by providing a pressurized compartment for each of the shafts for panning and tilting, each of the shafts being provided with a flange having pre-loaded roller bearings operating against both surfaces of the flange. The compartment is filled with extremely viscous fluid under pressure, operating against the force of a spring loaded piston within the tilting shaft, the pressure, and consequently the drag, being reducible from the pre-set pressure by an adjustment screw urging the piston against the force of its spring. The tilting shaft assembly is provided at the opposite end thereof with a crank coacting with a spring assembly to provide a counter-balancing moment to offset the moment due to the shift in the center of gravity of the instrument during tilting thereof, the spring force being adjustable to compensate for varying weights of different instruments.

17 Claims, 13 Drawing Figures

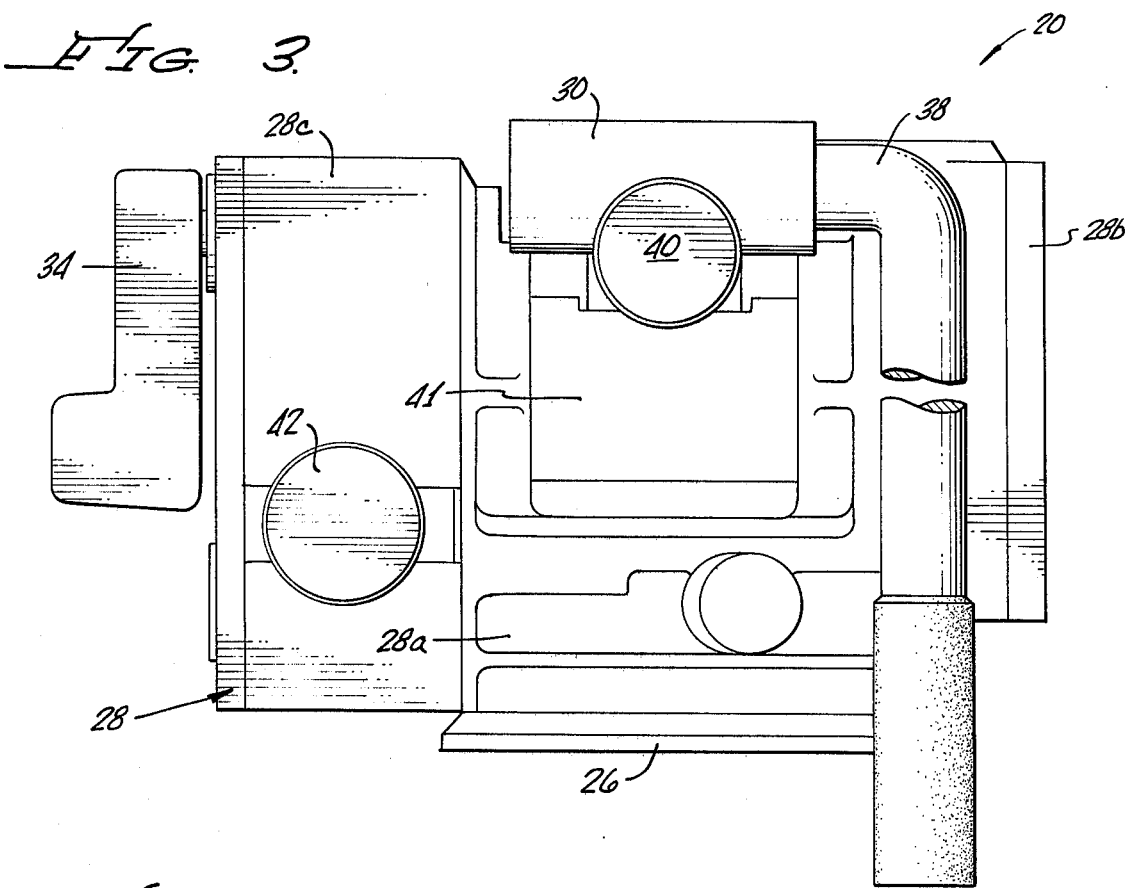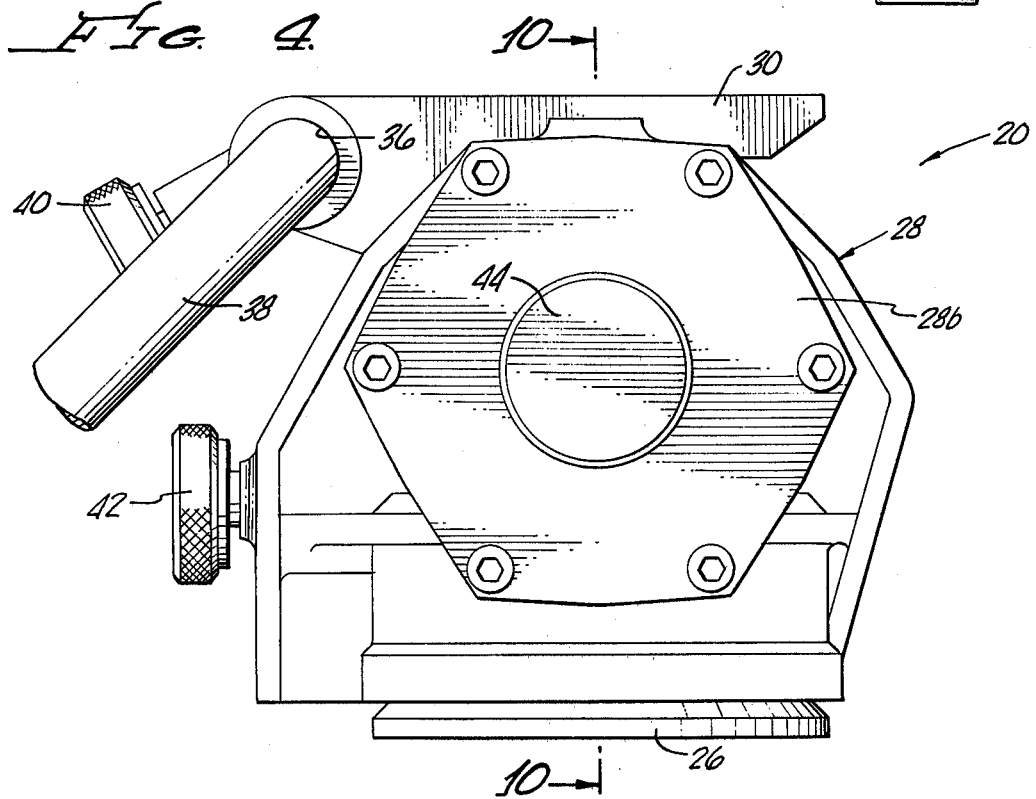

PANHEAD DRAG MECHANISM

BACKGROUND OF THE INVENTION

1. Field of the Invention

The present invention relates to instrument mounting assemblies and particularly to a panhead assembly for mounting instruments of the type designed for control about a vertical axis or a horizontal axis, such as a camera during panning or tilting.

This invention relates more particularly to a drag mechanism for such panheads as well as an adjustable loading system to permit a given panhead to accommodate different instruments within a range of weights.

An instrument panhead is that structure mounted between a stationary base and an instrument such as a camera which gives the instrument user the ability to tilt and pan the instrument about horizontal and vertical axes respectively. Panheads, particularly those intended for moving cameras, usually embody a drag mechanism to create an artificial resistance to instrument movement which, desirably, is both adjustable and constant. The effect is to obtain smooth, uniform rotation about the panhead axes at a rate dependent upon the direction and amount of force exerted by the instrument user.

Another problem related to optical instruments, such as cameras mounted on a panhead, is created by the shifting of the center of gravity of the camera during tilting, that is, rotation of the instrument with respect to a horizontal axis. The problem is especially troublesome when the camera is mounted above the panhead when the center of gravity of the instrument is displaced from a vertical line passing through the axis of rotation, thus creating a moment arm on one side or the other of the vertical axis during the tilting.

2. Description of the Prior Art

Various type drag mechanisms have been employed in an effort to create an artificial resistance to panning or tilting of the camera in order to provide a uniform movement of the instrument, notwithstanding erratic movements on the part of the operator. An early method employed, utilized cork covered brake shoes operating in an extremely viscous fluid within a brake drum, the spacing of the brake shoes being adjustable. This drag mechanism is shown in U.S. Pat. No. 2,998,953 entitled "Panhead", issued on Sept. 5, 1961, to O'Connor. This particular patent also showed a structure for overcoming the problem related to the weight shifting of the camera during the tilting operation by employing a pair of coil springs, one clockwise and one counter-clockwise, secured to the shaft defining the horizontal axis, the springs operating against each other to counterbalance the camera.

Another panhead drag mechanism is shown and described in U.S. Pat. No. 3,822,769 entitled "Panhead Drag Mechanism" issued to O'Connor on July 9, 1974, a mechanism utilizing a stack of drag plates mounted to slide into interleaved relationship with a plurality of discs fixed perpendicularly on the shaft. Similar discs and drag plates are utilized for the panning drag mechanism as well as the tilting drag mechanism.

U.S. Pat. No. 3,180,603 issued to O'Connor on Apr. 27, 1965, entitled "Instrument Supporting Head" shows a structure designed to circumvent the problem associated with the weight shifting of the camera by providing an offset platform, vertically positionable to a point where the center of gravity of the camera can be made to substantially coincide with the axis of rotation of the horizontal, or tilting, shaft. This patent also shows another type of drag mechanism.

Each of the preceding drag mechanisms requires, for its operation that surfaces such as plates or brake shoes, be in proximate relationship. Plates and brake shoes are essentially friction surfaces suitably arranged to provide the necessary drag force.

Although all the mechansims described in the preceding patents are suitable for the intended purpose, the requirements for various panhead mechanisms in large part will be determined by the instrument with which they are to be used and the application to which they are to be put. For cameras within a given weight range, such as 30 to 50 pounds, it is desirable that the panhead be compact and efficient, easily adjustable, and preferably have means for "tuning" the panhead to provide a counterbalance which is adjustable precisely in accordance with the weight of the instrument. For such a compact panhead it is likewise desirable to have the drag mechanism relatively uncomplicated and efficiently packaged in a minimal amount of space.

SUMMARY OF THE INVENTION

It is accordingly an object of this invention to provide a new and improved drag mechanism for a panhead or the like.

It is another object of this invention to provide a new and improved counterbalance mechanism for apparatus having rotation about a given horizontal axis with shifting moments due to center of gravity changes of the rotated component during operation.

It is a further object of this invention to provide a new and improved counterbalance mechanism for a panhead to permit the accommodation by the panhead of different instruments within a given weight range.

It is still another object of this invention to provide a new and improved panhead drag mechanism utilizing essentially frictionless roller bearings in a novel mechanism to provide drag.

The foregoing and other objects of the invention are accomplished by providing a panhead mechanism having a first shaft for "panning" or rotating about a vertical axis, and a second shaft for "tilting" or rotating about a horizontal axis, each of the shafts being provided with a flange portion, the flanges each having an annular disc-like roller bearing abutting against opposing faces of the flange, the bearings being maintained against the flange face by suitable spring means disposed within the housing of the panhead. The horizontal shaft member has an axially extending cylindrical aperture containing a spring loaded piston. A fluid-tight compartment is formed within the housing to encompass both flange and bearing assemblies, the compartment being filled with an extremely viscous fluid under high pressure with the face of the piston communicating with the fluid and operating against the force of its spring to a pre-determined position consistent with the pressure. The pressure, and consequently the drag, is adjustable downwardly from the preset maximum by means of an adjustment nut configured to fit the cylinder of the piston and operable by a threaded shaft actuated from the exterior of the housing whereby the nut can be adjusted against the face of the piston to thereby urge the piston against the force of its spring to reduce the pressure within the compartment. The rollers of the roller bearing, during movement of the mechanism, create a pressure differential in the fluid with the high pressure zone on the leading surface of the roller in the direction of travel, this pressure creating the drag. By varying the fluid pressure, the drag is varied.

The other end of the horizontal shaft is provided with a crank member having urging thereagainst spring means to provide a moment arm counterbalancing the moment arm of the supported instrument during tilting thereof. The spring means are a pair of compression springs supported by parallel opposing yokes, the upper yoke being pivoted by the crank arm, the lower yoke being supported at the outer end of a bell crank which is adjusted externally of the housing to adjust the spring compression and correspondingly the counterbalancing moment arm to permit the panhead to accomodate instruments of various weights.

The features of the present invention, which are believed to be novel are set forth with particularity in the appended claims. The present invention both as to its organization and manner of operation, together with further objects and advantages thereof, may best be understood by reference to the following description, taken in conjunction with the accompanying drawings in which like reference characters refer to like elements in the various views.

BRIEF DESCRIPTION OF THE DRAWINGS

FIG. 3 is a rear elevation of the panhead;

FIG. 4 is a right side elevation of the panhead;

DESCRIPTION OF THE PREFERRED EMBODIMENT

Figure 1:
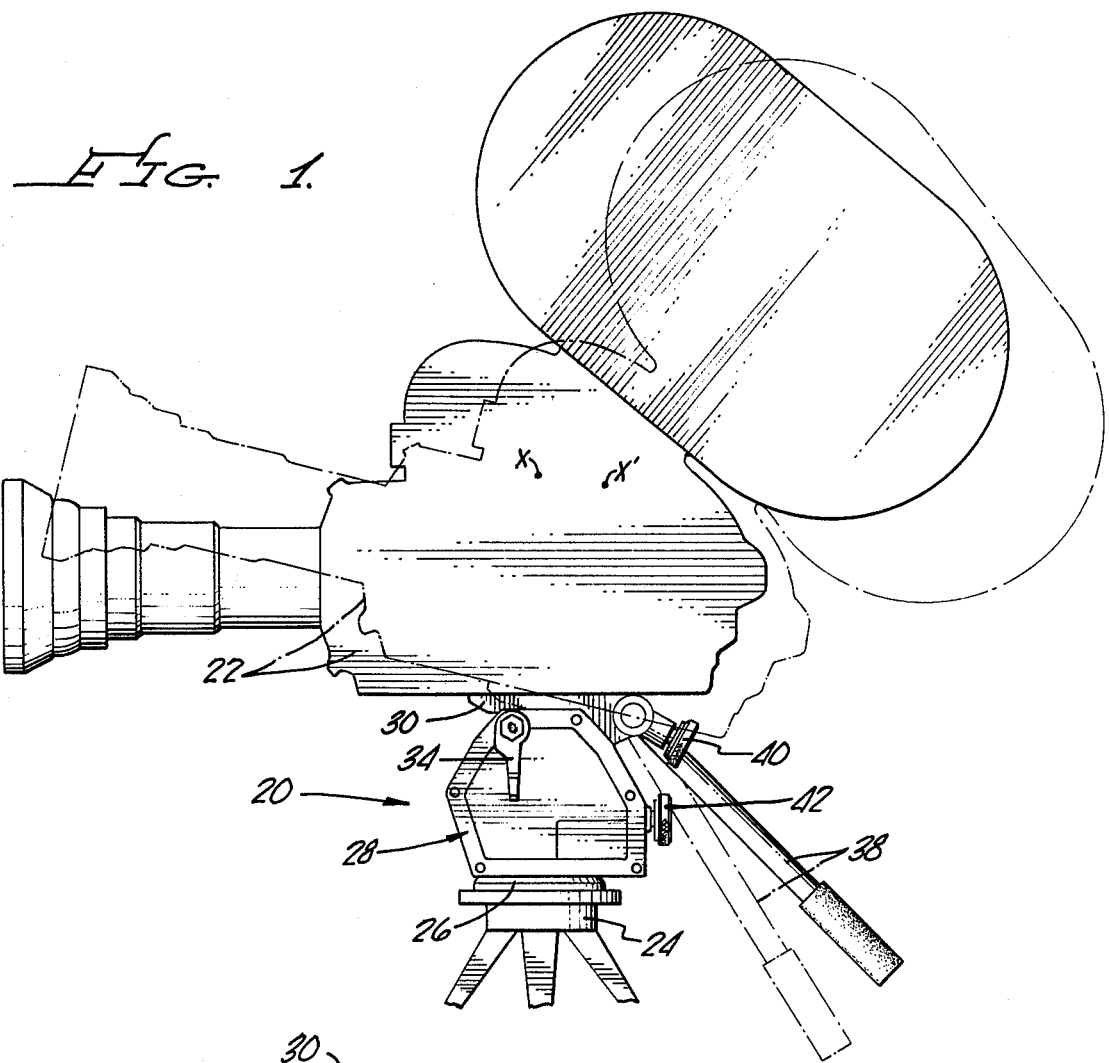
FIG. 1 is a side elevation of a panhead according to the invention showing a camera mounted thereon.

Referring now to the drawings and particularly to FIG. 1 there is shown a panhead 20 having mounted thereon an optical instrument such as a movie camera 22, the panhead 20 being suitably mounted on a supporting structure such as a tripod 24. The panhead 20 has a generally circular base member 26 which is fixed to the tripod 24, with a main housing or body 28 being adapted for rotation with respect to the base 26 in a horizontal plane. Affixed to the body 28 for rotation about a horizontal axis is a camera supporting platform 30 which has the camera 22 secured thereto in conventional fashion by screw means fixed in a slot therein to engage a mating aperture in the bottom of the camera 22.

The camera 22 is generally mounted on the platform 30 so that the center of gravity designated "X" of the camera is on a vertical line with respect to the horizontal axis of rotation when the platform 30 is generally horizontal. As shown by the dotted lines, as the camera is tilted, or rotated clockwise, the center of gravity shifts to the new position designated "X'", resulting in a downward force equal to the horizontal distance between X and X' times the weight of the camera. This weight must be compensated for within the body 28 of the panhead 20 and suitably counterbalanced, as will be hereinafter discussed. In order to lock the camera in a desired tilt position, a locking mechanism is provided and operated externally by means of the lock lever 34 external of the body 28 of the panhead 20.

Figure 2:
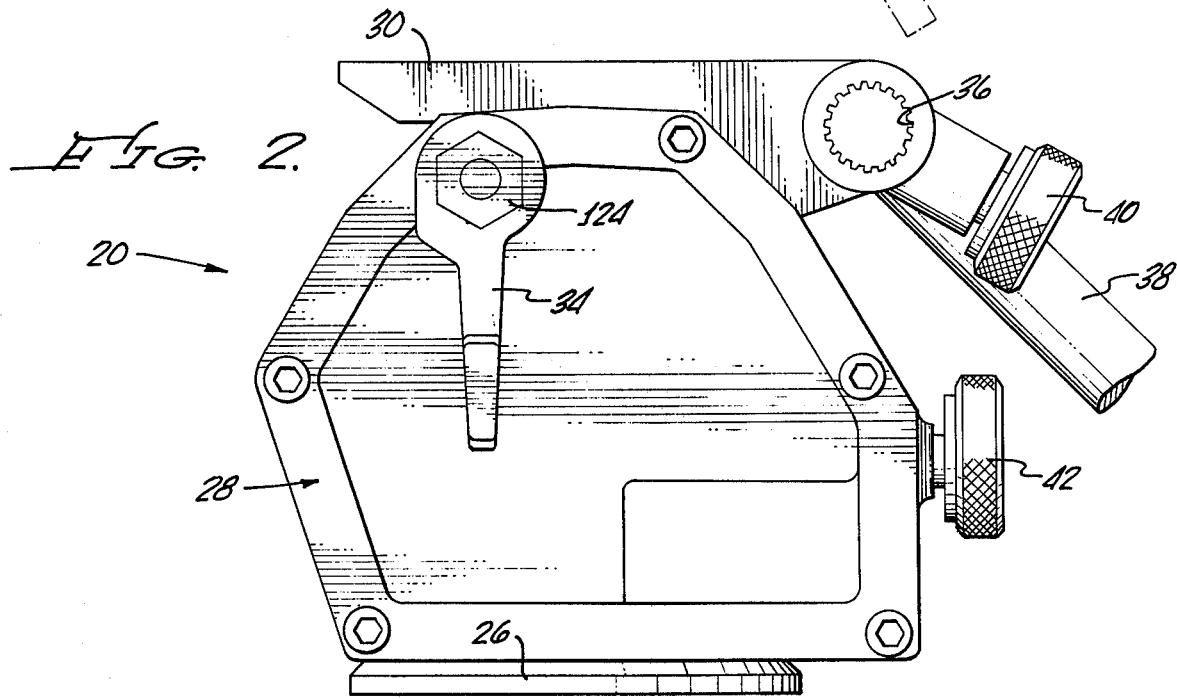
FIG. 2 is an enlarged left side elevation of the panhead of FIG. 1.

As shown in FIGS. 2–4 the platform 30 is provided at the rearward end thereof with a serrated circular aperture 36 which is adapted for engaging a generally L-shaped or U-shaped handle 38 which enables an operator to manipulate the panhead 20 and consequently the camera 22 for panning or tilting by means of handle 38. The handle 38 is securely locked in position by means of a knob 40 which operates screw means abutting against the surface of the handle 38 when inserted into the aperture 36.

As shown in FIG. 3, the panhead 20 has a generally U-shaped body, and as viewed from the rear in FIG. 3, the bight portion or pan fluid housing designated 28a contains the pan drag mechanism coacting with base 26; the right arm or tilt fluid housing 28b contains the tilt drag mechanism and the left arm or spring housing 28c contains the counterbalance mechanism and locking assembly. The camera platform 38 is securely affixed to a shaft 41 extending between tilt fluid housing 28b and spring housing 28c to provide a horizontal axis of rotation for the tilting of the camera in a vertical plane.

An external adjustment knob 42 is provided in spring housing 28c to vary the spring force associated with the counterbalance mechanism, as will be discussed hereinafter. Similarly, as shown in FIG. 4, an external adjustment knob 44 is provided in housing 28b to vary the tilt drag force. By the viewing of FIGS. 1-4, it can be readily understood that the camera 22, or any other instrument utilized, is larger in bulk than the panhead 20, yet the panhead 20 is compact and efficient in structure and placement of the various external adjustment means required for efficient use by the operator.

Figure 5:
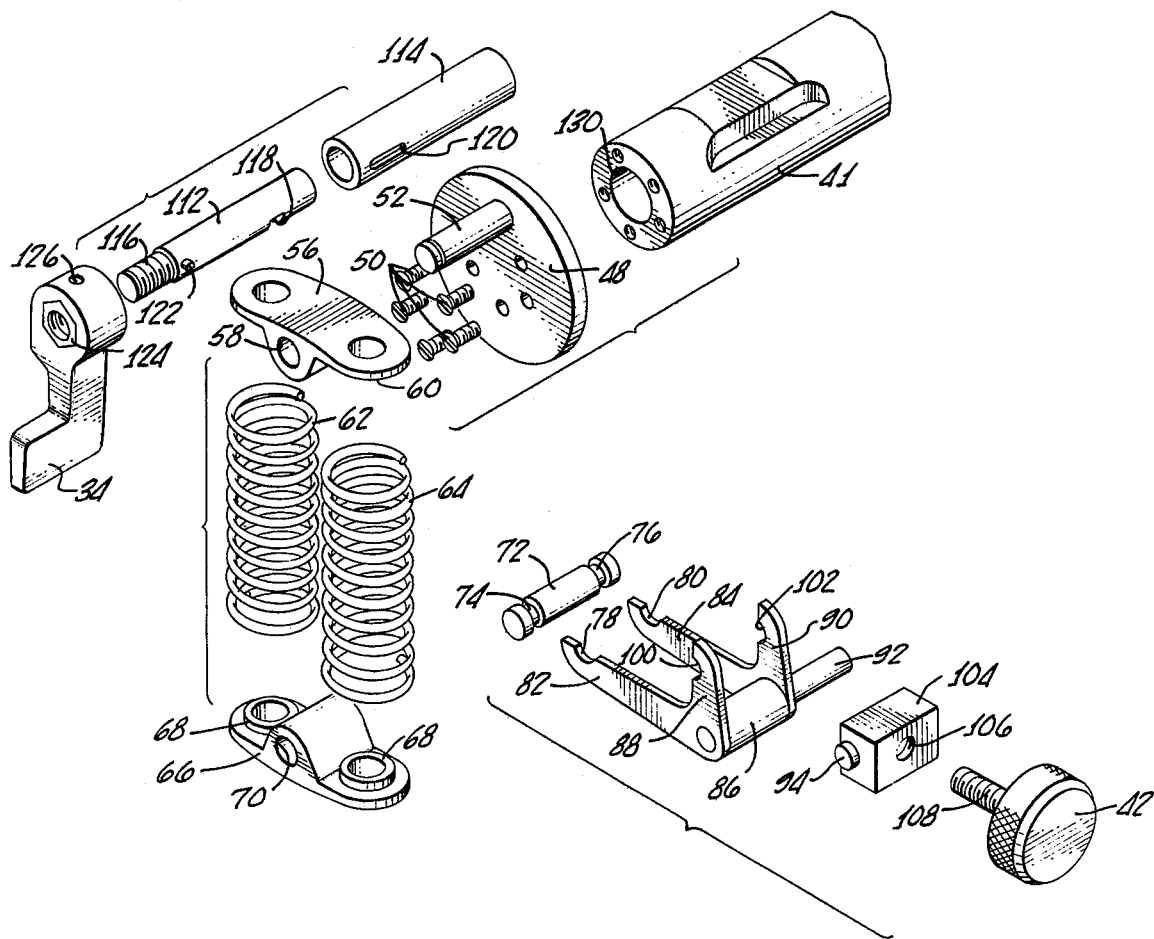
FIG. 5 is an exploded perspective view of the adjustable load tilt assembly mechanism in accordance with the invention.

Referring now to FIG. 5, the various components of the adjustable load counterbalance mechanism will be discussed. As previously mentioned, for a given panhead, it will be desirable to have a counterbalancing mechanism which is adjustable to compensate for the varying weights of instruments which might be utilized with the panhead. This adjustable counterbalancing force is particularly necessary in view of the shifting of the center of gravity of the instrument during the tilting operation as previously discussed in connection with FIG. 1. The panhead of the instant invention can be utilized with instruments within a range of, for example, 30 to 50 pounds by suitable adjustment of the counterbalancing mechanism as will be hereafter discussed. By reference again to FIG. 1, as the camera 22 is rotated clockwise from its original full line position where the center of gravity X is in a vertical line with the horizontal axis of rotation to some other position where the new center of gravity X' is displaced horizontally therefrom, during this rotation the downward force exerted by the center of gravity of the camera approximates a sine wave reaching a peak amplitude when the center of gravity X' is displaced to its maximum horizontal position. Ideally, a counterbalancing mechanism should offset this force by applying an equal and opposite force which itself is sinusoidal in nature, the force being applied in a counter-clockwise direction as the camera is rotated clockwise. Similarly, if the camera is rotated in a counter-clockwise direction the equal and opposing force should be applied in a clockwise direction.

Referring again to FIG. 5 the elements comprising the counterbalancing mechanism are shown in conjunction with the shaft 41, these components being assembled within spring housing 28c of the body 28. The shaft 41 has affixed thereto a crank plate 48 in generally circular form which is secured to the end of cylindrical shaft 41 by suitable screw means 50, the crank plate 48 rotating along with shaft 41. Secured to the crank plate 48 is a crank arm 52 which extends in a direction normal to the surface of crank plate 48 and is offset radially from the axis of rotation of shaft 41. The crank arm 52 is suitably grooved at the free end to accept a horseshoe shaped retaining clip 54 to thereby retain on crank arm 52 in rotational or pivotal relationship a whiffletree, or upper yoke 56, the yoke 56 being configured to have a centrally extending aperture 58 engaging the shaft or crank arm 52, the oppositely extending arms of yoke 56 each having downwardly depending circular shoulders (not shown), each having an outer diameter smaller than the inner diameter of the compression springs 62 and 64. A lower yoke 66 is identically configured to upper yoke 56 and is positioned with respect to upper yoke 56 so that the shoulders 68 thereof are disposed in facing relation to the shoulders of upper yoke 56, the compression springs 62 and 64 being retained between yokes 56 and 66 by means of the facing pairs of shoulders.

Centrally disposed within lower yoke 66 is a transversely extending aperture 70 adapted to receive a shaft 72 for pivotal movement of the yoke 66 with respect thereto. The shaft 72 has circumferential grooves 74 and 76 disposed in the surface thereof adjacent opposite ends, the grooves 74 and 76 being adapted to engage semi-circular recesses 78 and 80 respectively of a generally L-shaped bell crank assembly. Long arms 82 and 84 thereof have the recesses 78 and 80 formed in the free ends thereof. The arms 82 and 84 are maintained in spaced aligned relationship by means of a spacer 86 secured to the bell crank at the juncture between the long arms 82 and 84 and short arms 88 and 90. The spacer 86 is provided with a shaft portion 92 adapted to fit within an aperture of the spring housing 28c to permit pivotal movement of the bell crank about the axis formed by shaft portion 92.

Coacting with the free end of the short arms 88 and 90 with bell crank assembly is a transversely extending shaft 94 adapted for seating within semi-circular recesses 100 and 102, the shaft 94 being in two pieces and extending outwardly from adjustment block 104 which has extending therethrough a threaded aperture 106 in a direction transverse to the direction of shaft 94. The aperture 106 is engaged by an adjustment screw 108, the screw 108 having affixed to the other end thereof the previously discussed adjustment knob 42 externally of spring housing 28c. The adjustment screw 108 has the neck portion adjacent knob 42 unthreaded to form a bearing which extends through an aperture in spring housing 28c. In this manner, by rotation of knob 42 the spacing between the shaft 94 of adjustment block 104 is varied with respect to the stationary housing to vary the distance between the lower yoke 66 and the upper yoke 56 to thereby vary the amount of compressive force transmitted by the springs 62 and 64, thus varying, the counterbalancing force of the counterbalance mechanism.

Coacting with the crank plate 48 is a tilt locking assembly consisting of a shaft 112, a slotted sleeve 114 and the locking handle 34. The shaft 112 has a threaded portion 116 at one end thereof and has a transversely cut groove 118 in the surface thereof disposed inwardly from the other end, the groove 118 being adapted to have the outer periphery of the crank plate 48 extending therein in loose fitting relationship. The sleeve 114 has an inner diameter slightly greater than the outer diameter of shaft 112 to fit thereover with slot 120 being disposed in an axial direction to coact with a radially extending pin 122 secured to shaft 112 adjacent the threaded portion 116 thereof. The threaded portion 116 is engaged by a locking nut 124 which is broad-faced and adapted to abut against the adjacent end of sleeve 114. The handle 34 is suitably secured to the locking nut by means of a set screw 126.

Figure 10:
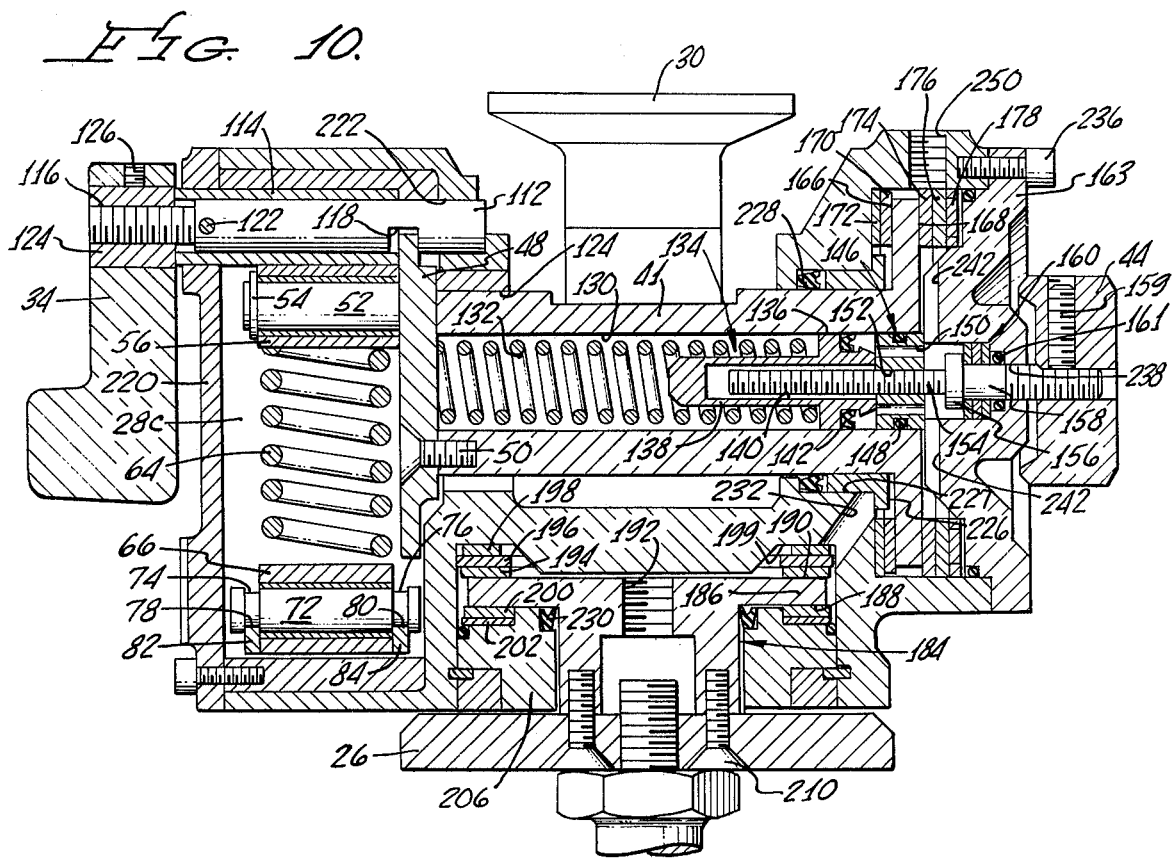
FIG. 10 is a cross sectional view of the panhead taken along line 10—10 of FIG. 4.

The shaft 112 is adapted to slidingly fit within a recess on the inner surface of spring housing 28c with the crank plate 48 positioned within groove 118 thereof (see also FIG. 10). The sleeve 114 encircles shaft 112 and has a length sufficient to abut against the face of crank plate 48 under force of the locking nut 124 as it is rotated on the threaded portion 116 of shaft 112. This effectively provides a disc brake action wherein the locking force is on a line normal to the plane of crank plate 48 with one surface of crank plate 48 being engaged by one edge of groove 118 and the other surface of crank plate 48 being engaged by the end of sleeve 114. In this manner precise tilt locking is effected in a way that no forces are generated which would result in a tilting rotation of the camera 22 during the locking of the shaft.

Figure 6:
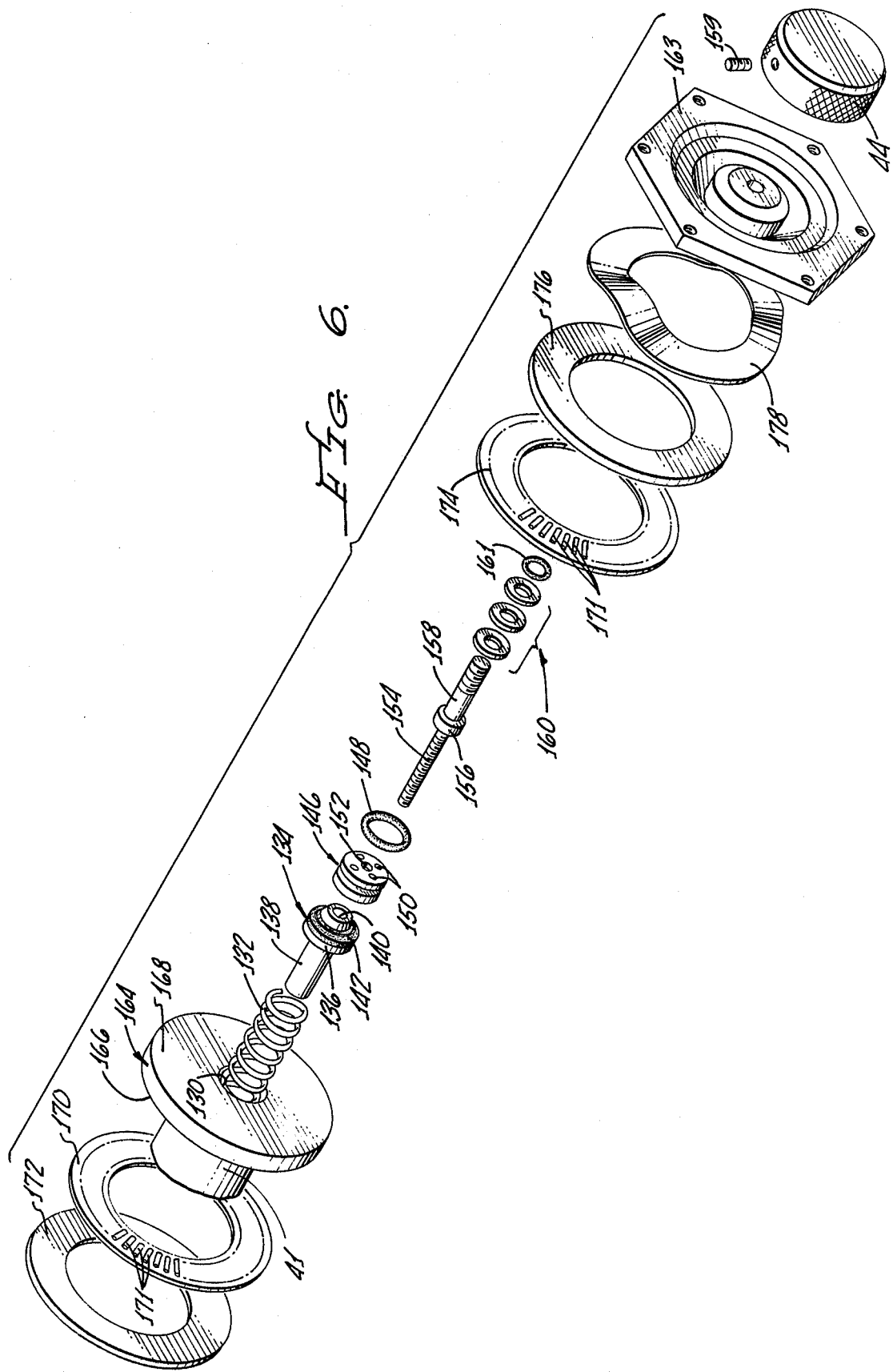
FIG. 6 is an exploded perspective view of the adjustable drag tilt assembly mechanism according to the invention.

Referring now to FIG. 6 the components of the adjustable drag tilt assembly mechanism will be described. As shown, the shaft 41 (only partially shown) is generally cylindrical in form and has extending therethrough an axially aligned cylindrical opening or chamber 130 (see also FIGS. 5 and 10) adapted to receive a compression coil spring 132 with one end thereof abutting against the adjacent inner surface of crank plate 48. The other end of compression spring 132 coacts with a piston 134, the piston 134 having a cylindrical piston surface 136 configured for close sliding relationship within opening 130, the shoulder portion of piston member surface 136 abutting against coil spring 132. The piston member 134 has a reduced diameter portion 138 elongate in form and encircled by a portion of spring 132. The piston 134 has an axially extending cylindrical recess or aperture 140 therein. The piston member 134 is provided with suitable gasket or sealing means 142 adjacent piston surface 136 to suitably seal the piston within the chamber 130 of shaft 41.

A cylindrical adjustment nut 146 has an outer diameter approximating the inner diameter of the cylindrical opening or chamber 130 of shaft 141, the nut 146 having a circumferentially extending groove for receiving an O-ring 148 for abutting against the inner surface of chamber 130 to maintain the adjustment nut 146 in position and prevent its rotation during operation of the adjustment of the tilt drag. The adjustment nut 146 has apertures or passage ways 150 extending therethrough for passage of fluid as will be discussed hereinafter. Extending centrally through adjustment nut 146 is a threaded aperture 152 adapted for receiving threaded shaft 154 which ultimately extends into the cylindrical recess 140 of piston 134. The shaft 154 is provided with an enlarged shoulder portion 156 which has extending therefrom a bearing shaft portion 158 in axial alignment with the threaded shaft 154 the bearing shaft portion 158 suitably receiving washers and bearings 160 and a sealing O-ring 161 which are adapted for engaging a matingly configured recess within the cover or sealing plate 163 of tilt fluid housing 28b. Secured to the free end of bearing shaft portion 158 is the adjustment knob 44 suitably secured externally of the housing by a set screw 159 or the like.

The end of shaft 41 is provided with an enlarged annular disc-like flange generally designated 164 having opposing faces 166 and 168 substantially parallel and generally well machined. Coacting with flange face 166 is an annular disc-like roller bearing 170 of conventional configuration having radially extending rollers 171 held captive within a suitable annular disc-like housing, the roller bearing 170 being adapted to abut against the adjacent flange face 166. Coacting with the opposite surface of roller bearing 170 is an annular disc-like race or washer 172 of substantially identical configuration having one surface thereof adapted to abut against roller bearing 170 and the other surface thereof adapted to abut against and within a cylindrical recess within the tilt fluid housing 28b. Coacting with the other flange face 168 is a second roller bearing 174 having the other face thereof engaged by a second race or washer 176 which has the opposing surface thereof abutting against one surface of an annular disc-like spring washer 178. When assembled, the spring 178 is maintained under compressive force by means of the housing or sealing cover 163 for sub-housing 28b. The bearing assembly thusfar described is in the nature of a thrust bearing although functionally, as will be hereinafter explained, it is different.

Figure 7:
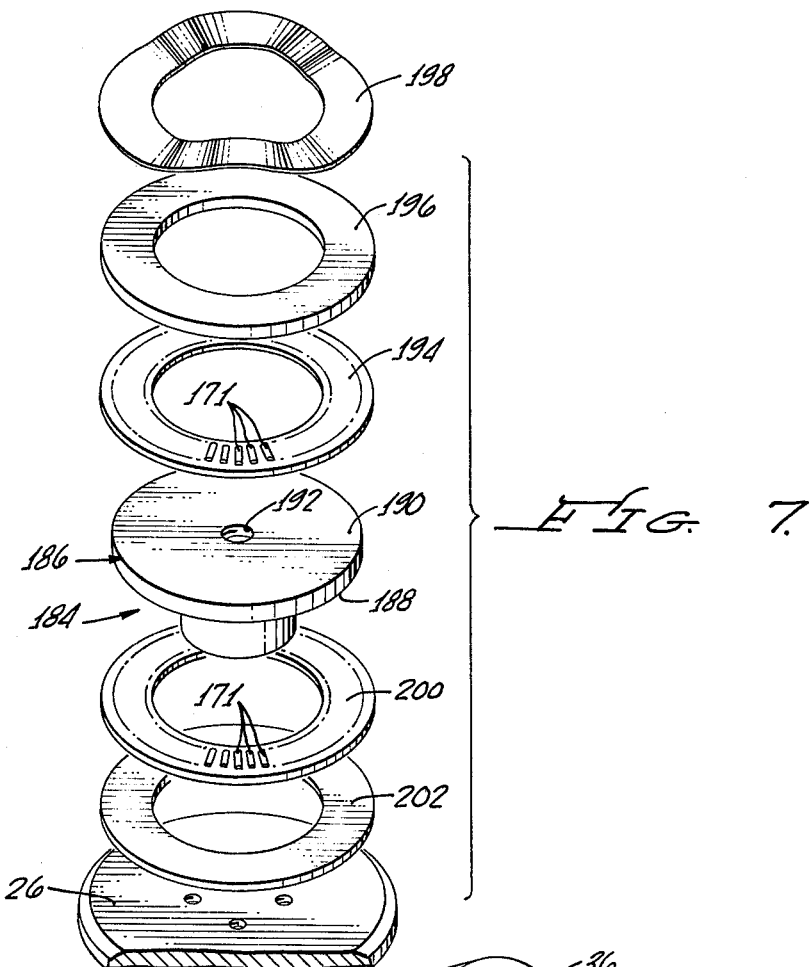
FIG. 7 is an exploded perspective view of the adjustable drag pan assembly mechanism in accordance with the invention.

Referring now to FIG. 7 the adjustable drag pan assembly mechanism components will be described. The assembly of the pan drag mechanism is virtually identical to that of the tilt drag mechanism and includes a truncated cylindrical shaft member 184 having an enlarged flange portion 186 with opposing disc-like flange faces 188 and 190 which are substantially parallel and well machined with an overall configuration substantially identical to flange 164. Extending centrally and axially through flange 186 is a threaded aperture 192 adapted for the passage of fluid therethrough as will be hereinafter discussed. Coacting with flange face 190 is a roller bearing 194 which in turn coacts with a race or washer 196 which in turn coacts with a spring member 198 identical to spring washer 178. The flange surface 188 coacts with a second roller bearing 200 which in turn coacts with a second race or washer 202. The race or washer 202 fits within an annular recess 204 of bearing block 206 (see FIG. 10) which is secured within pan fluid housing 28a, the bearing block 206 having a centrally disposed cylindrical bearing surface 208 adapted for coacting with the outer cylindrical surface of shaft member 184. The shaft member 184 is suitably secured as by screws 210 to the base 26 of the panhead. The annular spring member 198 fits within an annular recess 199 within pan fluid housing 28a and coacts thereagainst in compressive relationship.

Figure 8:
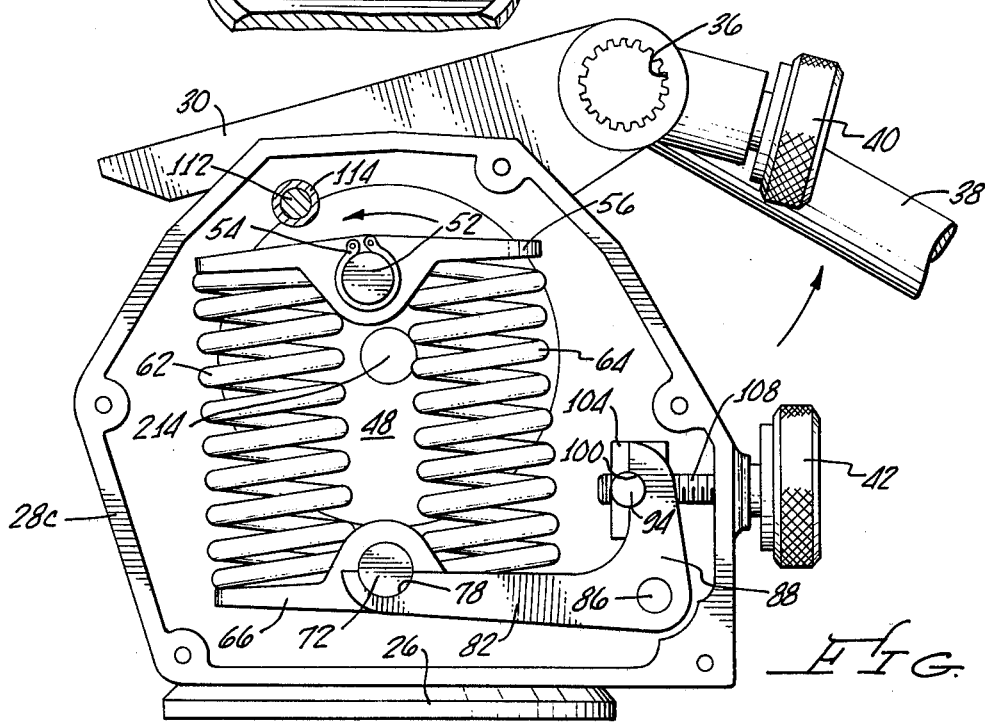
FIG. 8 is a left side elevational view similar to FIG. 2 with the side cover removed.
Figure 9:
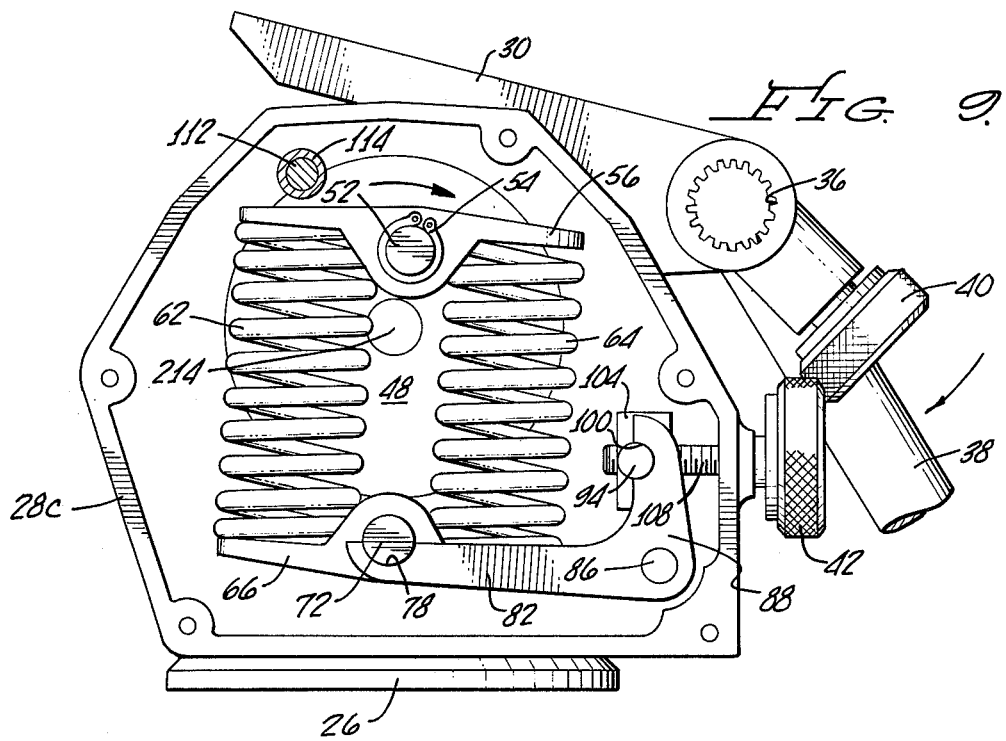
FIG. 9 is a side elevational view similar to FIG. 8 showing the counterbalance mechanism angularly pivoted from the position shown in FIG. 8.

Referring now to FIGS. 8 and 9, in conjunction with FIG. 5, the operation of the counterbalancing mechanism will be discussed in detail. In the view of FIGS. 8 and 9, the spring housing cover has been removed, and the parts are shown in assembled relationship within spring housing 28c, wherein the crank plate 48 rotates about a horizontal axis generally designated 214 which is the axis of rotation of shaft 41 previously discussed. The camera has been removed, but the discussion of the operation hereinafter will proceed on the assumption that the camera is mounted on the platform 30. As previously discussed in conjunction with FIG. 1, with a camera mounted on the platform 30 the center of gravity of the camera is initially set so that it is approximately on a vertical line extending through the center of axis of rotation 214. The center of gravity will be displaced some distance above the axis of rotation 214, and with the camera platform 30 disposed generally horizontally the crank arm 52 is disposed along a vertical line extending through the axis of rotation 214. The yokes 56 and 66 will be in generally parallel relationship on a generally horizontal plane with the compression springs 62 and 64 in parallel compressive relationship therebetween. The shaft 72, which supports the lower yokes 66 is along the same vertical line, and as will be discussed, remains on this vertical line during the operation of the counterbalancing mechanism.

As shown in FIG. 8, the handle 38 has been rotated upwardly as indicated by the arrow, thereby effecting counter-clockwise rotation of the crank plate 48 as indicated by the arrow thereon, resulting in a displacement to the left of the crank arm shaft 52 from the vertical line extending between the centers of shaft 72 and the axis of rotation 214. The selection of the values of forces transmitted by the compression springs 62 and 64 are dictated largely by the weight of the instrument to be mounted on the platform 30, and as previously indicated, the weight of the instrument in this particular example ranges between 30 and 50 pounds. The springs 62 and 64 will correspondingly be selected to offset the moment arms generated within this range of instruments.

In this particular view, the yokes 56 and 66 are still disposed in generally parallel relationship although the distance therebetween has decreased somewhat due to the shifting of the center of the crank arm 52 from its original position, thereby compressing spring 62 and 64. The lower yoke 66 has the pivot shaft 72 thereof cradled in the recesses within the free arms of long arms 82 and 84 of the bell crank which is pivotally supported by a shaft 92 extending in axial alignment with spacer 86 at the junction of long arm 82 and short arm 88. The short arm 88 of the bell crank is normally urged in a counter-clockwise direction under the force of the springs 62 and 64, but is maintained in position by means of the shaft 94 engaging the recesses within the short arms of the bell crank, the shaft 94 being carried by adjustment block 104. The threaded shaft 108 engages the threaded aperture within adjustment block 104 and extends through an aperture in spring housing 28c with the broad bearing face of adjustment knob 42 urging against the outer surfaces of spring housing 28c.

As illustrated in FIG. 9, if the operator depresses the handle 38 as indicated by the arrow, the platform 30 along with the camera is tilted in a clockwise direction along with crank plate 48 (as indicated by the arrow thereon), resulting in the shaft or crank arm 52 being displaced to the right to thereby decrease the length of springs 62 and 64 resulting in a greater upward force from springs 62 and 64 on the crank arm 52.

In any event, the free or natural length of the springs 62 and 64 is greater than the maximum working distance between the yokes 56 and 66, the counterbalancing mechanism being initially assembled by compressing the springs 62 and 64 during assembly with the threaded shaft 108 having the end thereof just engaging the threaded aperture in adjustment block 104.

For a given weight of instrument, the adjustment knob 42 is manipulated once until the desired results are achieved, and need not be further adjusted for that instrument. By viewing FIG. 8, as adjustment knob 42 is tightened, the bell crank is pivoted about an axis through spacer 86 in a clockwise direction thereby compressing springs 62 and 64 by urging shaft 72 and consequently yoke 66 in an upward direction so that the spacing between yokes 56 and 66 is effectively decreased. In this manner the platform 30 can accommodate a camera or other optical instrument of greater weight by providing an increased counterbalancing force to be transmitted to shaft or crank arm 52 of upper yoke 56. Similarly, for a lighter weight camera on platform 30, the adjustment knob 42 can be loosened to thereby increase the spacing between the housing and shaft 94 of the adjustment block 104. Thus the spring length increases to provide a lesser compressive force through the springs 62 and 64.

For a given camera or other instrument to be supported by the panhead, the instrument is intially mounted with the platform 30 in a horizontal plane so that the center of gravity of the instrument is in a vertical line with the axis of rotation 214 of the horizontal shaft 41. This can be checked by mounting the instrument and releasing the locking mechanism. If the camera is mounted correctly, no tilting or pivoting of the camera should occur. Once that position is determined, the adjustment of the compression of springs 62 and 64 can be accomplished by setting the camera to some tilt angle of, for example, 20° or 30°. If movement of the camera continues after releasing the camera, the knob 42 can be adjusted by tightening or loosening until the camera can be set at virtually any tilt angle with no further movement. Once this adjustment is effected through knob 42 for a given weight of instrument, it need not be further adjusted for that same instrument. However, if another instrument is mounted on the platform 30, the counterbalance mechanism must be suitably readjusted by means of knob 42 until the appropriate length of compression springs 62 and 64 is effected to offset or counterbalance the new instrument weight.

As can be appreciated, by reference to FIG. 1, again, the weight of the instrument in and of itself, is not the sole determining factor in the resultant downward force that will be applied by an instrument displaced at a given angle from vertical. The other factor that must be considered is the vertical distance between the axis of rotation 214 and the center of gravity of the instrument. For example, if an instrument is "top-heavy", with the center of gravity displaced at a greater distance from the axis of rotation 214, the length of the line projected on the horizontal will be greater through a given angle than will be a horizontal projection of this line for another instrument of the same weight having the center of gravity thereof closer to the axis of rotation. This variance in center of gravity locations of different instruments is likewise compensated for by the counterbalancing mechanism shown and described. The basic function of the counterbalancing mechanism is to provide an upward force equal to the downward force exerted as a result of the movement arm of a tilted camera or other instrument.

As shown in FIG. 8 and 9 at virtually all operative positions of the crank plate 48, the yokes 56 and 66 maintain essentially parallel relationship to transmit equal forces to either side of upper yoke 56 with the resultant force of the two springs 62 and 64 being applied to crank arm or shaft 52. It should be emphasized that although two compressive springs 62 and 64 are shown in this particular embodiment, a single spring could be utilized with the single spring extending between shaft 72 and crank arm or shaft 52. However, if only one spring is utilized the spring would, of necessity, have to be a greater length to provide a resultant upward force on shaft 52 equal to the two shorter springs 62 and 64 which are illustrated. By the utilization of two (or more) springs, as shown, the overall dimensions required for the counterbalancing mechanism can be decreased with each spring contributing half the force required for counterbalancing. By utilizing the counter-balancing mechanism, as shown, the springs can be preselected and the displacement of the crank arm 52 from the axis of rotation 214 can be so dimensioned that the resulting force, after proper adjustment of the mechanism, approximates a sine wave equal to the downward force created by the rotation of the camera during the tilting operation. In this manner an efficient and compact counterbalancing mechanism is provided which is adjustable to accommodate varying loads that might be employed as a result of the use of different instruments on a given panhead.

Referring now to FIG. 10 the various parts of the panhead are shown in assembed relationship, the counter-balancing and locking mechanism being contained within spring housing 28c which is covered by a suitable side plate 220. The shaft 112 is inserted within aperture 222 formed within spring housing 28c with the shaft 112 being in slidable relation within the aperture 222. The crank plate 48 is disposed for passage within groove 118 of shaft 112 and in the position shown the right hand edge of groove 118 abuts against the inner surface of crank plate 48 while the sleeve 114 abuts against the opposing surface under pressure of locking nut 124 engaging threaded shaft 116, thereby locking crank plate 48 and consequently shaft 41 to which it is affixed, from rotational movement.

The opposing inner surfaces of spring housing 28c and tilt fluid housing 28b are provided with aligned circular apertures into which are inserted suitable bearings 224 and 226 which receive shaft 41 therein. Bearing 226 fits within an inner cylindrical reces 227 of tilt fluid housing 28b which also contains a suitable fluid sealing gasket 228. Similarly the bearing block 206 is provided with gasket means 230 which coact with the adjacent surface of shaft member 184 in the pan drag assembly.

The housing 28 has pan fluid housing 28a suitably configured for receiving the pan drag assembly, while tilt fluid housing 28b is configured for receiving the tilt drag assembly mechanism and spring housing 28c is configured for receiving the counterbalance and locking assembly mechanism.

Pan fluid housing 28a and tilt fluid housing 28b are configured to provide functionally, a single fluid-tight compartment which is essentially physically, two compartments in fluid communication by means of an angularly extending enlarged opening 232 formed within body 28 between the two compartments. The tilt fluid housing 28b is sealed by means of the sealing plate 163 secured to the body 28 by suitable means such as cap screws 236, the sealing plate 163 having a centrally located aperture 238 extending therethrough for receiving shaft 158 coaxial with threaded shaft 154. The juncture of shaft 158 is suitably sealed with an O-ring 161 positioned within a recess within sealing cover 163.

The inner surface of sealing cover 163 is suitably machined for abutting against flange surface 168 of shaft 41. The machined inner surface of sealing cover 234 is provided with a plurality of radially extending slots 242 which permit the passage of fluid therethrough as will now be discussed.

After the various components of the panhead are in assembled relationship, as shown in FIG. 10, an extremely high viscosity fluid is inserted into the fluid-tight compartment by means of a fitting inserted through base 26 and communicating with aperture 192 within shaft member 184. The preferable fluid to be inserted is an extremely viscous temperature-stable fluid formulated from a silicone compound, the viscosity of which remains substantially constant over a wide temperature range. As is well known silicone compounds retain their physical characteristics through temperature ranges of minus 20° F to 120° F. A particular silicone fluid for use in the panhead according to the instant invention has been compounded from a substantially pure silicone rubber gum, which is mixed with a pure silicone oil to produce a fluid having the desired viscosity. It has been found that such solutions produce reliably uniform frictional resistance from minus 20° F to 120° F. This is to be contrasted with conventional lubricants and greases where the viscosity varies markedly with temperature.

Figure 11:
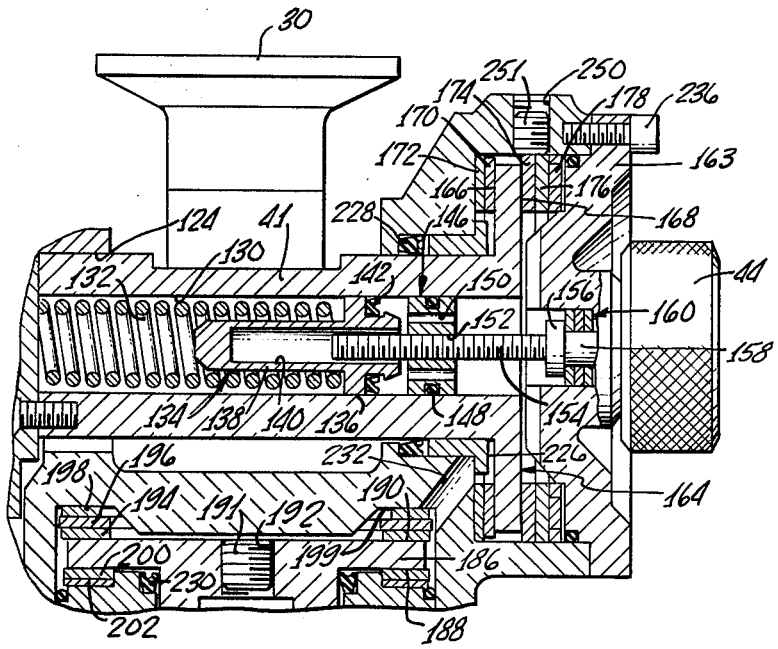
FIG. 11 is a partial sectional view of the tilt shaft showing the position within the shaft of the piston in its preloaded position with maximum pressure.

The compound so formulated is inserted into the fluid-tight compartment at high pressure through aperture 192. Initially, the piston 134 is in the position shown in FIG. 10 with the spring 132 being only partially compressed and adjustment nut 146 abutting against the adjacent inner face of sealing plate 163. The upper end of tilt fluid housing 28b is provided with an opening 250 which is threaded and in communication with the interior of tilt fluid housing 28b, the aperture 250 either being open to the atmosphere, or attached to a vacuum pump to assist in the compound or fluid insertion process. As the compound flows through aperture 192 within shaft 184 it passes through the openings formed within pan fluid housing 28a through aperture 232 into tilt fluid housing 28b through radially extending slots 242 on the inner surface of sealing cover 234 and through the apertures 150 in adjustment nut 146 into communication with the face of piston 134. At such time as the compound commences passing through threaded aperture 250, indicating that the air has been removed from within the compartment, the aperture 250 is suitably sealed off by means such as a set screw 251. As the compound fills the compartment under pressure, the piston 134 is moved to the left under the force of the entering compound until it reaches the position shown in FIG. 11 which would approximate a fluid pressure of approximately 300 pounds per square inch and the aperture 192 is sealed as by set screw 191 (see FIG. 11). In this particular position the fluid has forced itself into all crevices between the rollers 171 of each the roller bearings 170, 174, 194 and 200. At this point with no movement of the panhead in either the tilting or panning direction a static pressure is created within the compartment by virtue of the high pressure of the extremely viscous fluid within the compartment. With the compartments within housings 28a and 28b in fluid communication with each other by means of aperture 232, a single piston assembly 134 can be utilized to vary pressure throughout the two compartments.

As hereinabove described, the tilt drag assembly is constructed for rotation in a manner substantially identical to the pan drag assembly. In the panhead the roller bearings 170 and 174 along with the respective washers 172 and 176 are identical, respectively, with the roller bearings 194 and 200 and the washers 196 and 202 of the pan drag assembly. The respective flanges 164 and 186 are identical in overall configuration and size, although in accordance with the invention they need not be identical in size. The main difference in the operative configuration of the two shaft assemblies is the provision for the fluid pressure adjustment mechanism within the interior chamber 130 formed in shaft 41. Functionally, in operation, the coaction of the roller bearings with the flange of the shaft in the tilt drag assembly is identical to the coaction of the roller bearings with the flange of the shaft of the pan drag assembly, and the operation of only one drag assembly need be discussed in detail.

Figure 12:
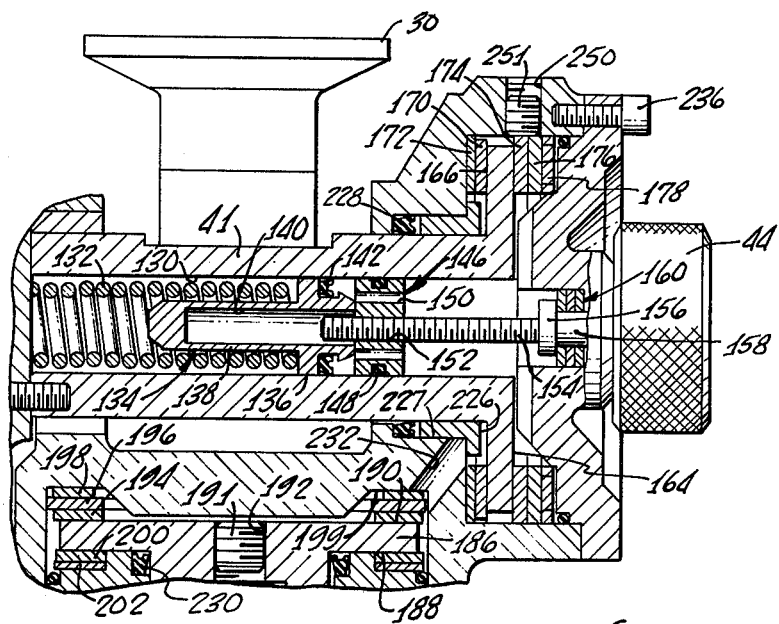
FIG. 12 is a partial sectional view similar to FIG. 11 showing the adjustment nut urging against the piston to reduce the compartment pressure.

With respect to the tilt assembly drag mechanism, the annular race or washer 172 abuts against a matingly configured recess within the body of tilt fluid housing 28b with roller bearing 170 abutting thereagainst and in close mating relation with flange face 166 of flange 164. Communicating with the opposite flange face 168 is a roller bearing 174 having abutting thereagainst race 176 and spring washer 178 which is compressed against the sandwich assembly in tight compressive relationship by means of an annular surface on the interior of sealing cover 163. The effect of the highly pressurized fluid within the compartment, in addition to urging against the piston 134, urges against the broad face 168 of flange 164 of shaft 41 thereby resulting in a piston-like action urging the shaft 41 to the left as viewed in FIGS. 10-12 to thereby increase the compressive force on roller bearing 170 interposed between the flange face 166 and the interior surface of the housing 28b.

Figure 13:
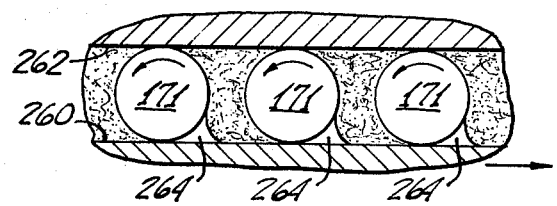
FIG. 13 is a diagrammatic view showing the movement of the rollers of the bearing between opposing surfaces.

By reference now to FIG. 13, the principles involved in the operation of the drag mechanism will be described with reference to the diagrammatic illustration wherein the retaining housing of the roller bearing has been removed and the rollers 171 are shown confined between two parallel surfaces designated 260 and 262 with the space therebetween entirely filled by the pressurized silicone fluid previously mentioned. The surface 260, for example, may be representative of the flange face of the pan shaft 184 while the opposing surface 262 can be representative of the race or annular washer 196 associated therewith. In any event, the surfaces 260 and 262 move relative to one another during movement or rotation of either the pan assembly mechanism or the tilt assembly mechanism. The roller bearings 171 are essentially frictionless elements which provide no wiping, or rubbing, of metal to metal since, if the lower surface 260 is moved to the right, as indicated by the arrow, the rollers 171 are rotated with respect to the stationary surface 262 in a counter-clockwise direction, as indicated by the arrows therein.

The silicone fluid within the housing, and within the space between the opposing surfaces 260 and 262 is under a pressure of approximately 300 pounds per square inch, this pressure having forced the fluid into all crevices surrounding each of the roller bearings 171. As the rollers 171 commence rotation in the counter-clockwise direction, a high pressure is created to the left, as viewed, of each roller and a low pressure is created to the rear, or right, of each roller 171. At the point where the peripheral surface of roller bearing 171 is leaving the lower surface 260, a void, as indicated by the designation 264, is created and the fluid must travel around the extremities of the bearing to fill the void 264, which due to its narrow dimensions, is in the nature of an orifice. The fluid filling the void 264 requires work resulting in additional drag. The resulting pressure differential generated by the movement of the rollers 171 through the high pressure fluid between the confining surfaces 260 and 262 provide the drag force in opposition to movement of either the tilting or panning mechanisms. By decreasing the pressure of the fluid between the opposing confined surfaces in which the rollers 171 travel the drag force is likewise reduced. Correspondingly, if the number of rollers 171 is increased the drag force created for a given diameter flange will be in proportion to the number of rollers 171. In the particular panhead herein described, the roller bearing selected for the application has a large number of rollers 171 and, when used as a thrust bearing, will carry a 3,000 pound thrust load, with an outer diameter of approximately 2½ inches. A 3,000 pound thrust on a bearing of this size is usual for this configuration, since there is no metal to metal contact when operating in a viscous fluid. As in any bearing application, the surface upon which the bearing rolls is covered by a thin film of fluid by virtue of the capillary action between the fluid and the surface, resulting in the bearing riding on the film rather than on the metal of the surface. As the bearing moves, due to the surface effect of the partial metal surfaces, the film builds up in thickness, thus urging the opposing confining metal surfaces apart.

By applying this principle to the subject panhead, as an operator tends to tilt the instrument upwardly or downwardly, the rollers from roller bearings 170 and 174 are resisting the rotation due to the pressure differential created with the pressure of fluid in the direction of movement of the rollers being very high to provide a drag force which prevents any rapid change in rotation of shaft 41 which would result in jerkiness, and consequently, undesirable characteristics in any sequence being filmed. As rotation commences, the individual rollers of each of the roller bearings 170 and 174 rotate peripherally about the surfaces of the respective flange faces 166 and 168 with the individual rollers 171 attempting to force the fluid in the direction of travel between the roller surface and the adjacent coacting flange face.

As the flange 164 moves with respect to the roller bearings 170 and 174, the rollers 171 of the bearing are riding on a thin film of silicone fluid which attempts to separate the flange faces from the coacting roller bearings, this action being resisted by spring washer 178 uring the parts into abutting relationship.

By the utilization of roller bearings, with no metal to metal contact, a problem associated with adjacent rubbing surfaces is eliminated. When coacting sliding surfaces are utilized, even in a viscous fluid, there is an initial resistance to relative movement of the coacting surfaces due to the tendency of the surfaces to stick together. This requires that the initial force to effect movement be somewhat, and usually substantially, greater than the force required to effect a uniform velocity of movement afterwards. With roller bearings this problem is virtually eliminated since the roller bearing surfaces are in rolling contact rather than surface or sliding contact.

If an operator desires to have less drag than the predetermined maximum amount of drag established by the piston 134, the pressure can be varied by the operator rotating the drag adjustment knob 44 to move the adjustment nut 146 inwardly within aperture 130 of shaft 41. The O-ring 148 prevents the adjustment nut 146 from rotating during the turning of knob 44 which rotates threaded shaft 154 to permit adjustment nut 146 to move to the left as viewed in FIG. 12 until the inner surface of adjusting nut 146 abuts against the face of piston 134 to move against piston 134 urging it against the force of its coil spring 132 to thereby enlarge the volumetric content of the compartment and consequently reduce the amount of pressure therein. By a reduction of the pressure within the compartment the amount of work necessary to displace the fluid in the direction of rotation of the roller bearings is decreased and similarly the amount of force exerted by movement of the roller bearings on the spring washer 178 is not as great creating a reduction in the amount of work necessary to rotate the shaft 41 during the tilting operation. By the structure shown and described an operator can adjust the tilt drag from a predetermined maximum established by the maximum fluid pressure within the compartment, to a minimum amount of drag, which, in the particular embodiment illustrated, would be atmospheric pressure or a slight vacuum within the compartment, with the adjusting nut 146 urging piston 134 to the extreme left adjustment position as viewed in FIG. 12. The range of pressures is accomplished by suitable dimensions of the inner cylindrical aperture 130 within shaft 41, the piston dimensions, as well as the overall volume of the compartment from maximum operating pressure to minimum operating pressure.

Due to the fluid communication between the compartment containing the pan drag assembly with the compartment containing the tilt drag assembly the fluid pressure within both compartments will be essentially the same at all times and determined solely by the initial pressure of the fluid and the ultimate position of the piston as determined by an operator controlling the adjustment nut 146 between the extremes of travel of the piston 134. Consequently, any adjustment effected by an operator to control the drag of the tilt will similarly control the drag associated with the pan assembly since both structures are essentially identical in configuration and operation.

With respect to the spring biased piston arrangement utilized operating within the chamber 130 of tilt shaft 41, this configuration readily accommodates expansion of the silicone fluid therein due to differing temperatures. As previously mentioned, the silicone fluid formulation was selected because of the substantially constant viscosity of the fluid over a wide temperature range. When the invention is utilized in a panhead for mounting a movie camera, the camera and panhead assembly can be utilized in a very wide temperature range from below freezing to over 100° F. With this kind of temperature swing, in the thermal coefficient of expansion of fluids in general, volumetric changes of the fluid will vary according to the temperature. If the piston were directly coupled to the threaded shaft 154, which is rotatably retained by the sealing cover 163 within the housing, the change in volume of the silicone fluid due to temperature variations would result in extreme pressure variations within the fluid which would likewise vary the drag force in an undesirable manner. By having the piston assembly 134 operating against a coil spring 132 within the chamber 130 in a "free-floating" manner, that is not mechanically retained in place, the pressure variations due to thermal expansion are eliminated with the piston position acting as means for allowing for the thermal expansion of the fluid. Once the panhead and the camera with which it is used maintains thermal equilibrium in a given ambient temperature, the adjustment of the piston position, and consequently the drag force, can be readily accomplished by an operator.

While the drag mechanism has been shown and described in conjunction with the panhead, it is to be understood that the drag mechanism can be employed in any apparatus wherein uniformly accelerating rotation of a shaft is required to a predetermined velocity of rotation with strict control of the evenness of rotation, notwithstanding the unevenness of the applied rotation of force. Other mechanisms with which the drag mechanism can be employed are, for example, telescope mounting mechanism for mounting the like or other assemblies such as lasers or similar optical instruments that are rotatably mounted where a substantially constant force against relative rotation is desired and the force can be suitably adjusted for different needs.

Similarly, with respect to the counterbalance mechanism, although it has been shown and described in conjunction with a panhead, it is to be understood that the adjustable counterbalancing mechanism can be suitably employed in any apparatus where it is desired to rotate an article having a center of gravity displaced from the axis of rotation, and counterbalancing forces are required to offset the moment arm created by the displacement of the center of gravity during rotation through a given angle. Telescopic instruments, or medical instruments, for example, may utilize the counterbalancing mechanism according to the invention.

While there has been shown and described a preferred embodiment, it is to be understood that various other adaptations and modifications may be made within the spirit and scope of the invention.

What is claimed is:

1. In a drag mechanism for pivotable apparatus, the combination comprising:
    a housing having a fluid-tight compartment therein;
    a shaft member fixed for rotation relative to said housing, said shaft member having an enlarged flange portion within said compartment;
    annular disc-like roller bearing members coacting against opposite faces of said flange portion;
    means within said compartment for urging said roller bearing members against said flange faces;
    a pressurized viscous fluid within said compartment and surrounding said roller bearing members so that a substantially constant force against relative rotation between said shaft and said housing is established; and
    means for adjusting the pressure of said fluid to vary the amount of said force.

2. The combination according to claim 1 wherein said pressure adjusting means includes a chamber having an opening communicating with said compartment and a piston operable within said chamber.

3. The combination according to claim 2 wherein said piston is spring biased and said adjustment means further includes means operable externally of said housing to vary the position of said piston within said chamber.

4. The combination according to claim 3 wherein said chamber is axially formed within said shaft.

5. The combination according to claim 4 wherein said means operable externally of said housing includes an adjusting nut operable within said chamber and a threaded shaft extending through a threaded aperture within said adjusting nut, said adjusting nut being adapted to urge against the face of said piston.

6. The combination according to claim 5 wherein said viscous fluid is a silicone fluid.

7. In a drag mechanism for pivotable apparatus, the combination comprising:
    a housing having a fluid-tight compartment therein;
    a shaft member fixed for rotation relative to said housing, said shaft member having a flange portion within said compartment;
    annular disc-like roller bearing means coacting against opposed sides of said flange portion;
    means within said compartment for urging said roller bearing means against said flange portion;
    a pressurized viscous fluid within said compartment and surrounding said roller bearing means so that a substantially constant force against relative rotation between said shaft and said housing is established; and
    other means communicating with said compartment for allowing for thermal expansion of said fluid to maintain the pressure thereof and for adjusting the pressure of said fluid to vary the amount of said force.

8. The combination according to claim 7 wherein said other means includes a chamber having an opening communicating with said compartment and a spring biased piston operable therein with the pressure of said fluid acting against said piston to preset said piston to a position indicative of said pressure, said piston operating against said spring to allow for thermal expansion of said fluid.

9. The combination according to claim 8 wherein said other means further includes an adjusting nut movable axially within said chamber by means of a threaded shaft extending through said adjusting nut, said adjusting nut being mechanically separate from said piston and being adapted to urge against the face of said piston to vary the pressure.

10. The combination according to claim 9 wherein said chamber is axially formed within said shaft.

11. In a panhead or the like, the combination comprising:
    a housing with a first compartment having mounted therein a first shaft for rotation about a first axis relative to said housing, and a second compartment having mounted therein a second shaft fixed for rotation relative to said housing on a second axis mutually perpendicular to said first axis, each of said shafts having an enlarged flange portion;
    means for maintaining said first and second compartments fluid tight;
    fluid communication means between said first and second compartments;
    fluid pressure responsive means communicating with said enlarged flange portions of each of said shafts, said fluid pressure responsive means being annular disc-like roller bearing members tightly retained against opposing faces of said flange portions;

a pressurized viscous fluid within said compartments and surrounding said roller bearing members to effect a substantially constant force against relative rotation between each of said shafts and said housing; and means communicating with one of said compartments to adjust the pressure of said fluid to thereby vary the amount of drag force transmitted by said fluid responsibe means to said shafts.

12. The combination according to claim 11 wherein said means for adjusting the pressure includes a chamber having an opening communicating with one of said compartments and a spring biased piston operable within said chamber under the force of said fluid to a predetermined position indicative of said pressure.

13. The combination according to claim 12 wherein said chamber is axially formed within one of said shafts and said means for adjusting the position of the piston further includes an adjusting nut mechanically separate from said piston and operable within said chamber by means of a threaded shaft extending therethrough and rotatable externally of said housing, said adjusting nut being adapted to urge against the face of said piston.

14. The combination according to claim 13 wherein said fluid communication means is an aperture formed within said housing between said first and second compartments.

15. The combination according to claim 14 wherein said chamber and said adjusting nut are cylindrical, said adjusting nut having an O-ring disposed in a peripheral groove thereof to prevent rotation of said adjusting nut during rotation of said threaded shaft.

16. The combination according to claim 15 wherein said adjusting nut has apertures therein for fluid passage therethrough.

17. In a panhead for supporting an instrument and having an axis about which the instrument can be swung, a drag device for insuring smooth scanning movement of the instrument comprising in combination:

a compartment having a circular shoulder portion concentric with said axis;

a shaft having a flange portion having the outer perimeter thereof configured similarly to said shoulder portion;

a first annular disc-like roller bearing member interposed between the flange face and said shoulder portion;

a second annular disc-like roller bearing member coacting with the opposite face of said flange;

means coacting against said shoulder portion for maintaining said roller bearings in tight abutting relation with said flange;

sealing means for maintaining said shaft within said compartment and for maintaining said compartment in fluid tight relation;

a chamber having an opening communicating with said compartment;

a spring biased piston operable within said chamber;

a pressurized viscous silicone fluid within said compartment and surrounding said roller bearing members to establish a constant force against relative rotation between said shaft and said housing, the pressure of said fluid acting against said piston to preset said piston to a position indicative of said pressure; and means for adjusting the position of said piston within said chamber to vary the pressure of said fluid to thereby vary the amount of drag force during rotation of said shaft.

* * * * *